United States Patent [19]
Davis

[11] Patent Number: 5,971,919
[45] Date of Patent: Oct. 26, 1999

[54] LIGHT INTENSITY AND COLOR ADJUSTABLE ENDOSCOPE

[76] Inventor: James M. Davis, 4687 Pond Apple Dr. South, Naples, Fla. 33998

[21] Appl. No.: 09/053,428

[22] Filed: Apr. 1, 1998

Related U.S. Application Data

[60] Provisional application No. 60/041,800, Apr. 3, 1997.
[51] Int. Cl.$^6$ ...................................................... G02B 6/40
[52] U.S. Cl. ......................................... 600/180; 600/181
[58] Field of Search .................................. 600/132, 186, 600/181; 385/115, 172, 177, 178, 179, 182

[56] References Cited

U.S. PATENT DOCUMENTS

| | | | |
|---|---|---|---|
| 4,407,272 | 10/1983 | Yamaguchi | 600/180 |
| 4,737,622 | 4/1988 | Shishido | 600/180 |
| 5,007,408 | 4/1991 | Ieoka | 600/180 |
| 5,101,468 | 3/1992 | Chiu | 600/180 |
| 5,159,380 | 10/1992 | Furuya | 600/180 |

Primary Examiner—Linda C. M. Dvorak
Assistant Examiner—Ira Hatton
Attorney, Agent, or Firm—William E. Noonan

[57] ABSTRACT

A light adjustable endoscope is disclosed for use in combination with a standard fiberoptic illuminator having a light output port. The endoscope includes a scope portion and an apparatus interconnected between the illuminator and the scope for transmitting light to the scope and adjusting the intensity and/or color of that light.

14 Claims, 5 Drawing Sheets

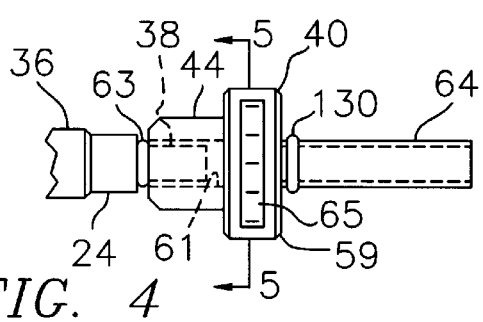
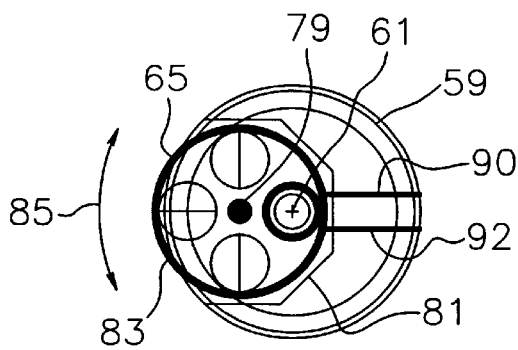
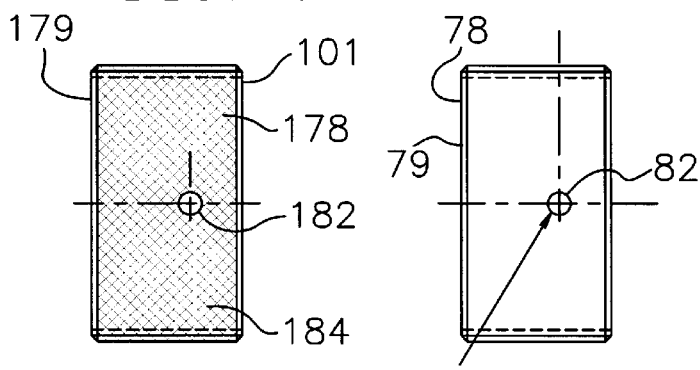
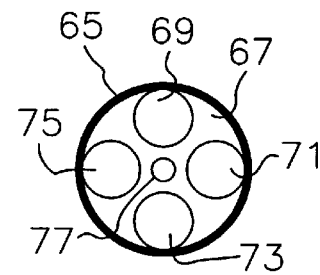
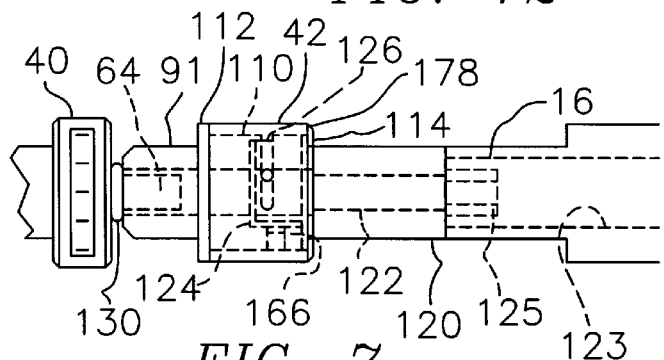
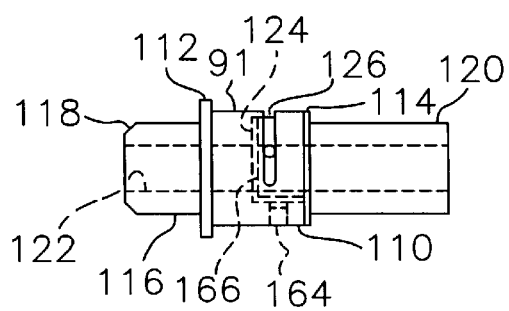
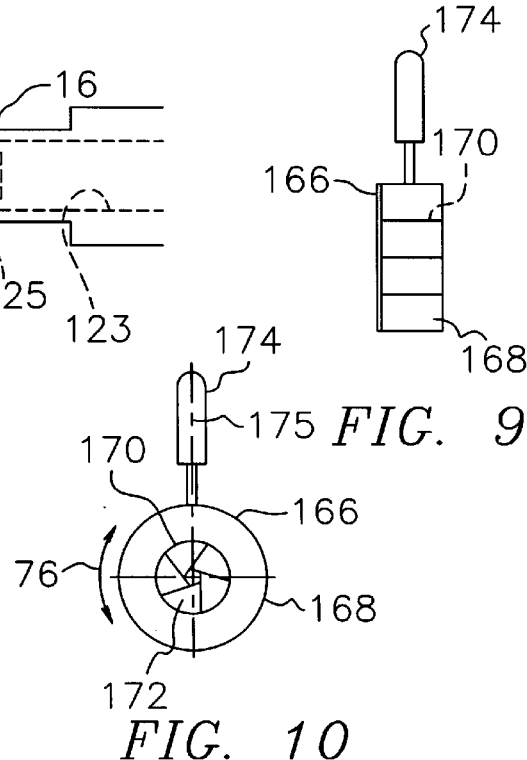

LIGHT INTENSITY AND COLOR ADJUSTABLE ENDOSCOPE

RELATED APPLICATION

This application is a continuation in part of U.S. Provisional patent application Ser. No. 60/041,800, filed Apr. 3, 1997.

FIELD OF THE INVENTION

This invention relates to a light intensity and color adjustable endoscope and, more particularly, to an apparatus that permits adjustment of the intensity and/or color of light transmitted by a medical endoscope.

BACKGROUND OF THE INVENTION

Endoscopes are widely used to examine conditions within the gastrointestinal system or other internal regions of the human body. Conventionally, most endoscopes employ an elongate scope that is interconnected to a video camera. A fiberoptic light source delivers xenon and other types of light through the scope so that viewing is enhanced.

At present, there is only a very limited capability for adjusting the intensity and color of light transmitted by the endoscope. Intensity adjustment is desirable to provide the surgeon with optimal visual acuity. Available fiberoptic illuminating light sources have an intensity control knob or dial located on the front panel of the illuminator. However, as discussed in co-pending provisional patent application Ser. No. 719,839 filed Sep. 3, 1996, such devices have serious limitations. The illuminator is usually not readily accessible to the surgeon who is operating the endoscope. Accordingly, the surgeon's attention to the medical procedure is interrupted if he or she is required to make the lighting adjustment. Alternatively, the lighting adjustment must be made by a nurse or other medical assistant. Resulting miscommunications can interfere with obtaining the precise intensity required for the medical procedure. Interruptions and unnecessary delays are likely to result.

Adjusting the color of light transmitted by the endoscope is also quite important. Often, filtered light is required to detect and diagnose particular medical conditions. For example, under certain lighting conditions the endoscope can differentiate between cancerous and non-cancerous tissue, due to the light reflection and absorption characteristics of that tissue. As discussed in my co-pending provisional patent application Ser. No. 60/036,372, filed Jan. 22, 1997, known fiberoptic illuminators employ a digital touch pad that provides for filtering or color adjustment of the light produced by the illuminator. However, operation of this touch pad again causes the previously described problems, including distractions to the doctor and/or miscommunications between the physician and assisting personnel. To date, no known medical endoscopes employ a quick, convenient and reliable means for allowing the physician to personally adjust the intensity and/or color of the light transmitted by the endoscope.

SUMMARY OF INVENTION

It is therefore an object of this invention to provide a mechanism for quickly, conveniently and reliably adjusting the intensity and/or color of light transmitted by a medical endoscope.

It is a further an object of this invention to provide an apparatus that permits a surgeon using an endoscope to personally adjust the light intensity and/or color without requiring the assistance of other medical personnel.

It is a further object of this invention to provide a light adjustable endoscope that is adjusted without having to directly access the light source or manipulate dials, knobs or touch pads on the light source.

It is a further object of this invention to provide a light adjustable endoscope that effectively diagnoses medical conditions present in internal organs and tissues of the body.

It is a further object of this invention to provide a light adjustable endoscope that permits light color and/or intensity to be adjusted much more quickly and accurately than has heretofore been possible.

It is a further object of this invention to provide a light adjustable endoscope that permits precise wavelength bands of light to be selected to properly illuminate corresponding types of tissue.

It is a further object of this invention to provide a light adjustable endoscope that enables the color and/or intensity of light transmitted by the endoscope to be adjusted virtually instantaneously by the surgeon or other person using the endoscope without diverting that person's attention from the task at hand and without requiring the user to communicate lighting requirements to an assistant or other personnel.

This invention results from a realization that the color and/or intensity of fiberoptic illumination transmitted by an endoscope may be adjusted quickly, accurately and efficiently by constructing an endoscope that includes separate controls for intensity and color. This permits light intensity and/or color adjustments to be made directly by the surgeon, doctor or other personnel using the endoscope. This novel means of intensity and/or color adjustment supplements and improves upon the conventional adjustments located directly on the illuminator and significantly facilitates the use of endoscopes in surgical and other medical operations.

This invention features a light adjustable endoscope. The endoscope includes a scope portion that is operably interconnected to a video camera. There are light transmitting means having a first end portion that is operably interengaged with a light source. Light adjusting means operably interconnect an opposite second end portion of the light transmitting means with an inlet carried by the scope. The light transmitting means include an elongate, light transmitting fiberoptic cable. The light adjusting means include means attached to the cable, between the first and second end portions, for selectively adjusting at least one of the intensity and color of light transmitted through the cable from the light source to the scope.

In a preferred embodiment, the means for selectively adjusting includes an intensity control mechanism and a color adjustment mechanism that are disposed side by side adjacent the second end portion. A second intensity control mechanism and/or a second color adjustment mechanism may be located proximate the first end of the means for transmitting.

The intensity control mechanism may include an adjuster housing that is connected to one end of a fiberoptic cable and has means defining an interior passageway through which light is transmitted. The intensity control mechanism may further include an adjustable iris disposed within the housing and extending across the passageway. A means may be provided for selectively opening and closing the iris a chosen amount to adjust the intensity of light passing through the iris. The cable may carry a light conducting plug and the intensity control mechanism may include a light conducting channel that communicably receives the plug. The adjuster housing may include an elongate slot adjacent to the iris. The means for selectively opening and closing the iris may include a handle operably attached to the iris and extending through the slot. The handle is movable in a first direction to open the iris and in an opposite, second direction to close the iris. The iris may have a generally circular shape and the handle may extend radially from the iris. The housing may include a circular, cross sectional shape and the means for selectively opening and closing may include a generally annular component disposed circumferentially about and mounted for selectively rotating on the adjuster housing. The annular component may be attached to the handle such that rotation of the annular component about the housing in the first direction moves the handle in the first direction to open the iris and, rotation of the annular component in the second direction moves the handle in the second direction to close the iris. The annular member may include a hole that receives the handle to secure the annular component to the handle. The handle may include an upper end that terminates not higher than the circumferential surface of the annular component.

Alternatively, the intensity control mechanism may include a wheel rotatably mounted in a housing and having a graduated series of openings formed therein. A selected one of the openings is positioned across a light passageway through the housing to permit a predetermined intensity of light to be delivered to the scope. In still other embodiments, a rotatable wheel is provided with a single, variable width opening that is positioned to deliver a selected intensity of light to the scope.

The means for adjusting may include a color adjuster housing. Preferably, the color adjuster housing is interconnected between the fiberoptic cable and the intensity adjuster housing. The color adjuster housing has means defining an interior passageway through which light from the fiberoptic cable is transmitted. A filter wheel may be mounted rotatably within the housing and carry a plurality of light filters, each of which defines a selected wavelength or color band. The filter wheel is rotated to position a selected one of the filters across the passageways such that a selected color or wavelength band of light is transmitted to the passageway. The filter wheel is preferably mounted in an offset manner within the housing. The periphery of the filter wheel is engaged to rotate the wheel such that a selected filter is positioned in the passageway.

The first end portion of the means for transmitting may include means for operably interengaging complementary means in the light source. The means for operably interengaging may include an intensity control mechanism that is constructed as described above.

The light adjusting means may be permanently and communicably interengaged with the inlet of the scope. Preferably, the second end of the light transmitting cable includes an end fitting that communicably interengages the light adjusting means.

DETAILED DESCRIPTION OF PREFERRED EMBODIMENTS

Other objects, features and advantages will occur from the following description of preferred embodiments and the accompanying drawings, in which:

FIG. 4 is an elevational side view of the color adjustment mechanism as attached to the output end of the fiberoptic cable;

FIG. 5 is a cross sectional view taken along line 5—5 of FIG. 4;

FIG. 6 is an elevational front view of the color wheel;

FIG. 7 is an elevational side view of the intensity adjustment mechanism interconnected to the color adjustment mechanism;

FIG. 8 is an elevational side view of the adjuster housing for the intensity adjustment mechanism;

FIG. 9 is an elevational side view of the iris;

FIG. 10 is an elevational front view of the iris;

FIG. 11 is an elevational side view of a representative rotatable annular component or ring used on the intensity adjustment mechanism;

FIG. 12 is a cross sectional view of the annular adjustment component;

Figure 1:
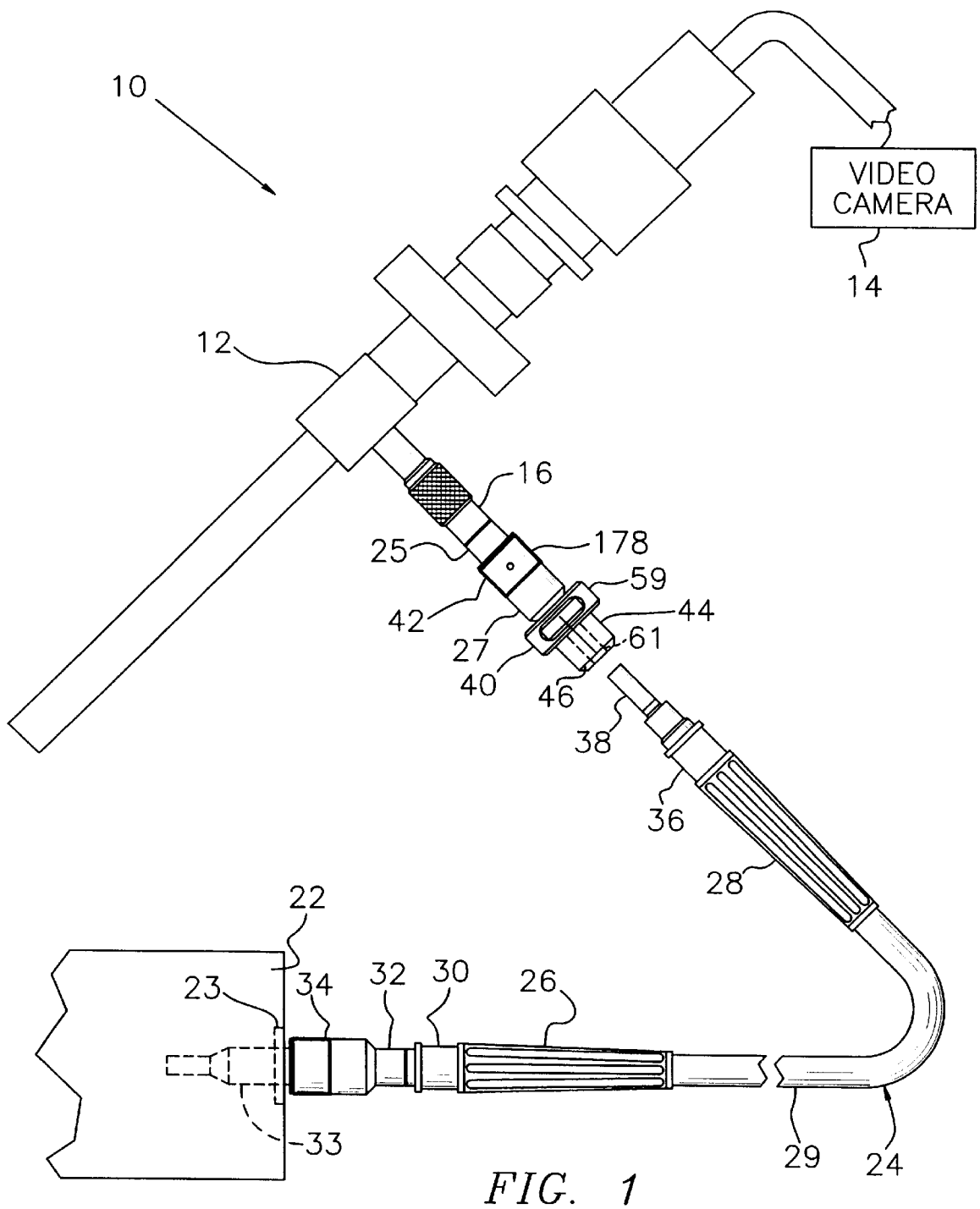
FIG. 1 is an elevational, side view (partly in schematic) of a preferred light adjustable endoscope according to this invention.

There is shown in FIG. 1 a light adjustable endoscope 10. The endoscope includes a conventional scope mechanism 12 of the type used in various medical and surgical applications. For example, the endoscope may be used to investigate and diagnose problems within the gastrointestinal system. Endoscopes are also often employed by introducing them through a trocar so that a patient's tissue or internal organs may be investigated. The apparatus of this invention may be adapted to virtually all known types of medical endoscopes.

A video camera 14 is operably interconnected to scope 12 in a known manner. The scope includes an optical light inlet 16. In the prior art, the inlet of the endoscope releasably and communicably receives one end (i.e. the output end) of a standard fiberoptic illuminating cable. Light is transmitted through that cable from a fiberoptic illuminator. The light is delivered to the scope through the inlet so that the endoscope may be operated in a known fashion.

By employing the present invention, the intensity and/or color of the light introduced to scope 12 through inlet 16 may be adjusted. This is accomplished by mounting a light intensity and color adjusting assembly 27 to endoscope inlet 16 and interconnecting a light transmitting cable 24 between illuminator 22 and assembly 27. The illuminator does not comprise a part of this invention and is not described in detail herein. A typical illuminator includes various dials and gauges, as well as a standard light output port 23 that is operably engaged by a plug or fitting 33 located at a first end of cable 24. A second plug or fitting 38 located at the opposite, second end of cable 24 interengages a passageway 61 of assembly 27. An outlet 25 of assembly 27 is fixed, either permanently or releasably to inlet 16. The illuminator produces a desired type of light (e.g. xenon, halogen, neon, etc.). This light is introduced into cable 24, which is engaged with illuminator port 23. The light is transmitted through cable 24 and assembly 27, in a manner that will be described more fully below, and introduced into the scope through inlet 16.

Figure 2:
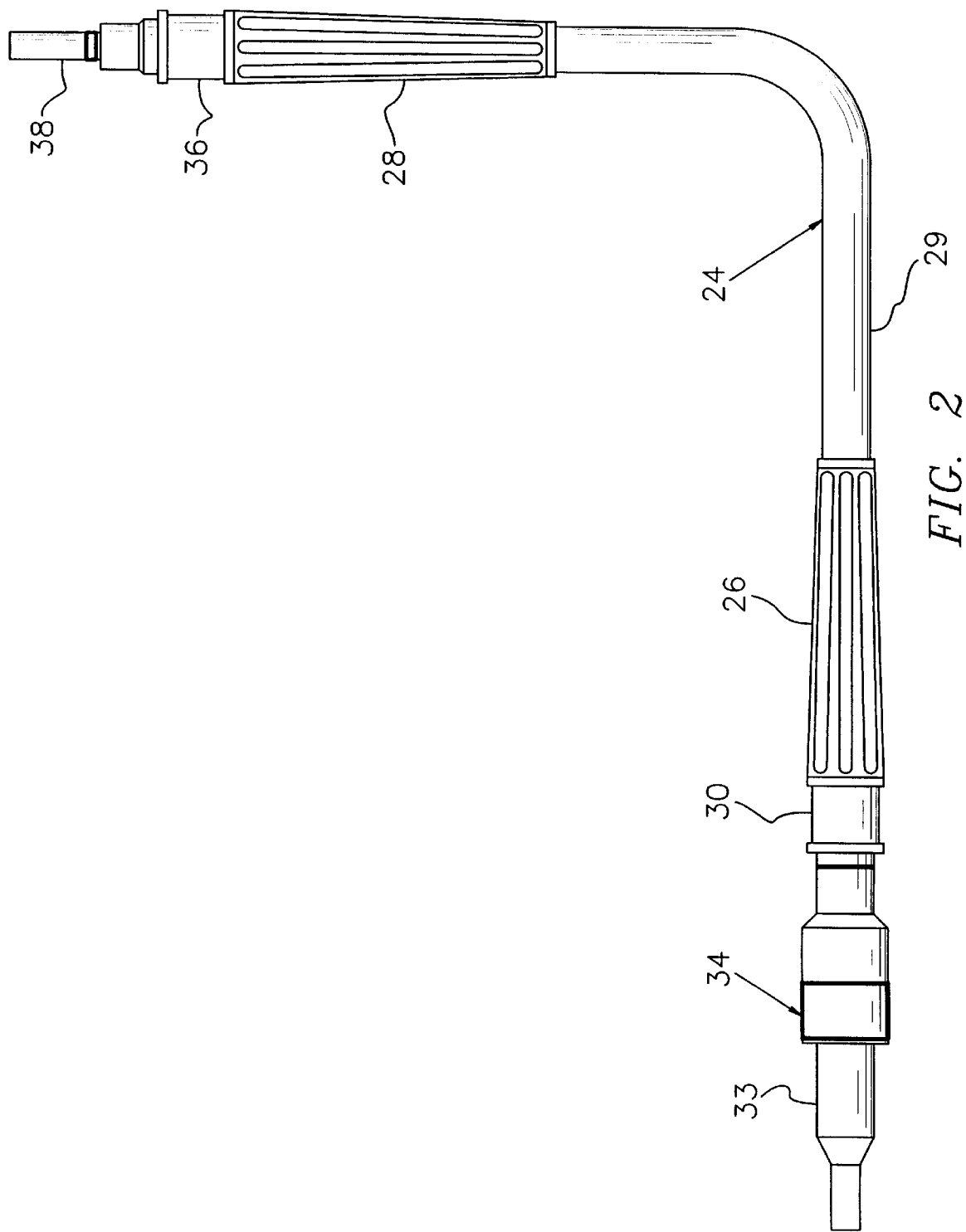
FIG. 2 is an elevational side view of a preferred fiberoptic cable used in the endoscope.
Figure 3:
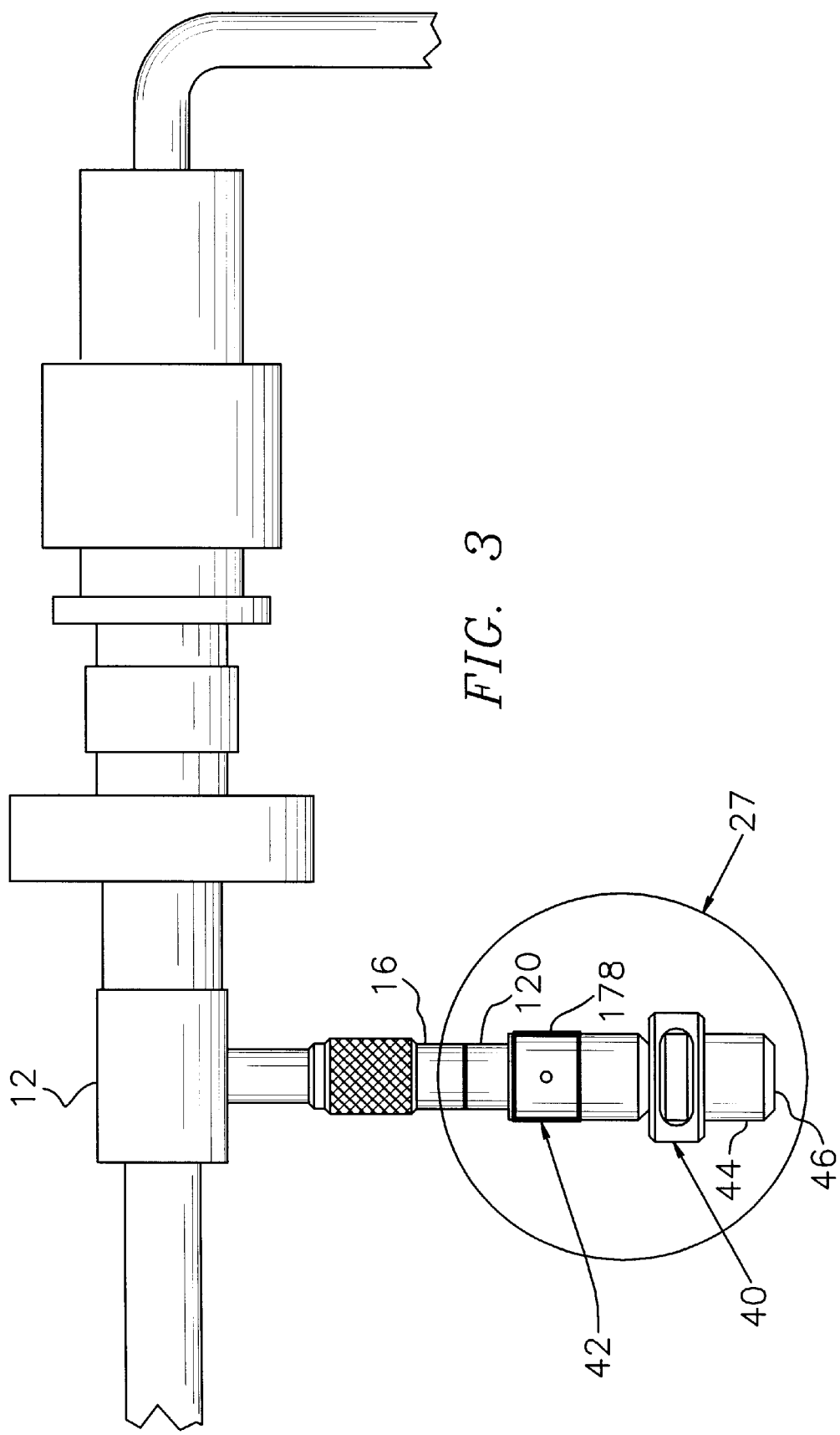
FIG. 3 is an elevational, side view of the endoscope with the intensity and color adjusting mechanisms attached thereto.

Fiberoptic cable assembly 24 is shown alone in FIG. 2 and adjustment assembly 27 is shown attached to scope 12 in FIG. 3. Fiberoptic cable assembly 24, transmits light from illuminator 22 between inlet fitting 33 and an outlet fitting 38. The cable assembly comprises an elongate, conventional, universal fiberoptic cable component 29 having a construction that is well known to those skilled in the art. A tapered casing portion 26 is carried by cable component 29 proximate the end of assembly 24 closest to the illuminator; a second tapered casing portion 28 is carried proximate the opposite distal end of assembly 24. A stepped cylindrical bushing 30 is attached to casing portion 26. A similar bushing 36 is attached to casing portion 28. Fiberoptic cable 29 extends generally centrally through casing portions 26 and 28. Cable 29 carries an optical fiber, not shown. This is typically a standard optical fiber of the type shown and described in co-pending patent application Ser. Nos. 08/718,839 and 60/036,372.

Assembly 24 also includes an optional intensity adjuster mechanism 34 interconnected between bushing 30 and fitting 33. Adjustment mechanism 34 is operated to control the intensity of light directed through assembly 24. An adjuster mechanism of this type is again described in pending application Ser. No. 08/719,839. Analogous structure is also described below in connection with the intensity adjustment mechanism located in assembly 27. It should be understood that the optical fiber is operably interengaged with adjuster mechanism 34 in the manner shown in that co-pending application. Fitting 33 includes a central channel, not shown, that is communicably interengaged with a central opening formed through adjuster housing 34. Again, reference should be made to co-pending application Ser. No. 719,893.

At the opposite end of assembly 24, fitting 38 is attached to bushing 36. Fitting 38 includes a central channel that is communicably aligned with the optical fiber carried by cable 29. As a result, light may be transmitted the entire length of apparatus 24 from fitting 33 to fitting 38. Intensity control mechanism 34 permits intensity to be adjusted at the illuminator panel, even when the illuminator lacks its own intensity knob. As a result, less expensive constant intensity illuminators may be retrofit with an intensity control mechanism. This improves the usefulness of these devices considerably in the endoscopic field.

As illustrated in FIGS. 1 and 3, light adjusting assembly 27 includes a color adjustment mechanism 40 and an intensity adjustment mechanism 42. These components are attached in an end to end arrangement such that they are conveniently operable by the surgeon or technician using the endoscope. The structure and operation of each of these components will now be described in detail.

Color adjuster mechanism 40 includes a generally cylindrical housing 44 and a larger diameter flange 59. The distal end 46 of housing 44 is tapered. As best shown in FIGS. 4 and 5, a central passageway 61 is formed axially through housing 44. Passageway 61 communicably interengages the fitting 38 carried by cable apparatus 24. A gasket, seal or ring 63 formed about fitting 38 interengages the distal end of housing 44. An axial tubular element 64 is communicably joined to passageway 61 and extends from flanged end 59 of housing 44.

As illustrated in FIGS. 1, 3, 4 and 5, a circular filter wheel 65, shown alone in FIG. 6, is rotatably mounted in flange portion 59 of adjuster housing 44. Filter wheel 65 includes a frame 67 and four individual life filters 69, 71, 73 and 75 that are mounted within frame 67. A central opening 77 is engaged by a pin 79, FIG. 5, that rotatably mounts wheel 65 within flange 59 of housing 44. As best shown in FIG. 5, the filter wheel is received in an octagonal recess 81 formed within flange 59. Wheel 65 is axially offset within housing 44 such that a selected one of the filters 69, 71, 73 and 75 may be positioned centrally within the cylindrical housing between passageway 61 and tubular element 64. This is accomplished by rotating wheel 65 about pin 79 to position the selected filter in front of passageway 61. As best shown in FIG. 5, a peripheral portion 83 of wheel 65 protrudes from adjuster housing flange 59. As a result, the operator can place his or her thumb against peripheral edge 83 and rotate the filter wheel 65 in the directions indicated by double-headed arrow 85. In this manner, a selected filter 69–75 may be operably positioned between passageway 61 and tubular element 63 so that only light of the corresponding color or wavelength band is transmitted through color adjuster mechanism 40. This filter is held in place in the selected position by a locking detent mechanism 90. This mechanism includes a spring loaded ball plunger 92 that is mounted within flange portion 59 of housing 44. A plurality of tiny recesses are formed about the circumference of wheel 65. Each recess is positioned proximate one of the filters 69, 71, 73 and 75. As the selected filter is rotated into position adjacent passageway 61, the ball of plunger 92 engages the recess to hold the filter wheel in that selected position. To manipulate the filter wheel into an alternative position, the operator simply presses his or her thumb against edge 83 of wheel 65 and rotates the wheel, as indicated by double-headed arrow 85. This urges the recess to disengage the ball of plunger 92. The plunger allows wheel 65 to rotate until the next selected filter is properly positioned in front of passageway 61. The recess associated with this filter then engages the ball plunger to provisionally lock the filter wheel and the selected filter in place within adjuster housing 44.

Color adjustment mechanism 40 is interconnected to intensity adjustment mechanism 42 in the manner illustrated in FIG. 7. Intensity controller mechanism 42 includes a controller housing 91, best shown in FIG. 8. Housing 91 includes a generally cylindrical main body portion 110 that is bounded by flanges 112 and 114. A cylindrical first extension section 116 extends from flange 112 and includes a tapered annular end portion 118. A second cylindrical extension portion 120 extends from flange 114. The extension sections may be unitarily or otherwise attached to the respective sections. Housing 91 features a central conduit 122 that extends completely through body portion 1 10 and extension sections 116 and 120. A transverse cavity 124 having a generally circular, cross sectional shape is formed within body portion 110. A circumferential slot 126 is formed in body 110 and, as best shown in FIG. 8, extends approximately 90 degrees about the circumference of the body. Slot 126 communicates with interior cavity 124 such that the interior cavity is exposed through the slot.

As best shown in FIG. 7, tubular element 64 of color adjustment mechanism 40 is snugly fitted within central channel 122 of intensity adjustment mechanism 42. The tolerance between channel 122 and element 64 is such that the tubular element is held firmly in place within the channel. As a result, color adjustment mechanism 40 is attached to intensity adjustment mechanism 42. A seal or gasket 130 formed about element 64 interengages the distal end of body 91 and extends about the entrance of channel 122. As a result, light transmitted through mechanism 40 enters channel 122 of intensity adjustment mechanism 42.

As shown in FIGS. 7 and 8, an adjustable diameter iris 166, shown alone in FIGS. 9 and 10, is mounted within cavity 124 of controller housing 91 such that it extends transversely across channel 122. A set screw 164, FIG. 8, is formed through the wall of body portion 110 adjacent cavity 124. The set screw is tightened to secure iris 166 within cavity 124. As a result, the iris is positioned within channel 122 in the path of the light emitted by tubular segment 64.

As best shown in FIGS. 9 and 10, iris 166 comprises a standard adjustable iris apparatus having a circular configuration. The iris apparatus includes an annular frame 168 having a central opening 170. A plurality of plate-like iris segments 172 are formed at an interleaved or fan-like fashion within opening 170. A handle 174 is moved selectively back and forth, as indicated by double-headed arrow 176, through a circumferential slot in fame 168 such that the iris is selectively opened and closed, as desired. Rotating handle 174 in one direction (either clockwise or counterclockwise) widens or opens iris 172 and rotating the handle in the opposite direction narrows or closes the iris. Furthermore, the degree of rotation determines the extent to which the iris is opened or closed.

In FIGS. 9 and 10, iris 166 is shown in with a conventional full handle 174, including a relatively wide portion 175. Preferably, when iris 166 is installed within cavity 124, the wide outer end 175 of handle 174 is removed so that the handle does not extend to the height illustrated in FIGS. 5 and 6. Rather, the handle is shortened such that it engages but does not extend beyond an annular component or ring that is mounted about housing 91. This is described more fully below.

As shown in FIGS. 1, 3 and 7, an annular intensity controller ring 178 surrounds and is rotatably mounted on controller housing 91. More particularly, ring 178 is rotatable about central body portion 110, as best shown in FIG. 7, such that one edge of ring 178 abuts flange 112 and the other edge abuts flange 114. A hole 182 is formed through the ring for receiving handle 174 of iris apparatus 166. As previously explained, handle 174 is cut off such that it does not extend beyond the outer surface of ring 178. As best shown in FIG. 11, outer surface 184 includes a knurled pattern that facilitates gripping of the ring so that it may be rotated conveniently about cylindrical body portion 110.

As shown in FIGS. 1, 3 and 7, extension section 120 of controller mechanism 42 is communicably interengaged with inlet 16 of scope 12. This connection may be either permanent or releasable. In a permanently connected version, extension section 120 is secured to inlet 16 such that channel 122 communicates with inlet channel 123. Various known means of permanent interconnection may be used. Alternatively, present endoscopes may be retrofit with assembly 27. In such versions a releasable interconnection is provided between the adjusting assembly and the endoscope. For example, as shown in FIG. 7, an optional light transmitting plug 125 may be carried by extension 120 and received by channel 123 of inlet 16. Various other means for communicably connecting assembly 27 to endoscope 12 should be known to persons skilled in the art. It should also be noted that the intensity adjuster mechanism 34 carried by fiberoptic cable assembly 24 includes a construction analogous to that shown in FIGS. 7–12.

In operation, light transmitting and controlling apparatus 20 is interconnected between illuminator 22 and inlet 16 of scope 12. The illuminator is operated to direct a selected type of light through assemblies 24 and 27 and into the endoscope. Specifically, the light is introduced through fitting 33 and transmitted through intensity control mechanism 34, which is adjusted to transmit a selected amount of light through cable assembly 24. In applications where the surgeon or other person using endoscope 12 is personally responsible for adjusting the light, intensity controller 34 is simply set at a fully opened position. In alternative embodiments, the intensity controller 34 may be eliminated entirely. In such cases, cable assembly 24 may constitute a standard universal cable without any type of intensity or color adjusting mechanisms whatsoever.

The light is transmitted through cable assembly 24 and is transmitted by end fitting 38 into passageway 61 of color adjustment mechanism 40. The color adjustment mechanism is adjusted to provide light of a selected color to scope 12. Specifically, color or wavelength bands may be adjusted by turning color wheel 65 in the manner described above such that a selected filter is positioned in the light path. Typically, the filter and associated wavelength band are selected to provide optimal illumination of a particular corresponding type of tissue. It should be understood that an analogous color adjustment mechanism may be located adjacent to intensity control mechanism 34 at the opposite end of cable assembly 24. In certain embodiments, the intensity adjustment mechanism 34 may be eliminated and a color adjusting mechanism alone may be provided adjacent to end fitting 33.

In any event, the light is transmitted from passageway 61, through the selected filter of mechanism 40 and into tube 64. As a result, the light is introduced into channel 122 of intensity control mechanism 42. The surgeon or other medical personnel adjusts iris 65 so that a selected intensity of light is output from mechanism 42 through extension portion 120. Ring 178 is rotated clockwise or counterclockwise, as required, to selectively open (widen) or close (narrow) the iris a chosen amount. As the iris is widened, the intensity of light transmitted through mechanism 20 increases. Conversely, as the iris is narrowed, the intensity decreases. The light, which now has a selected color and intensity, is then delivered into attached inlet 16 of scope 12. Finally, this light is directed by the scope to the area of the body being examined.

Figure 13:
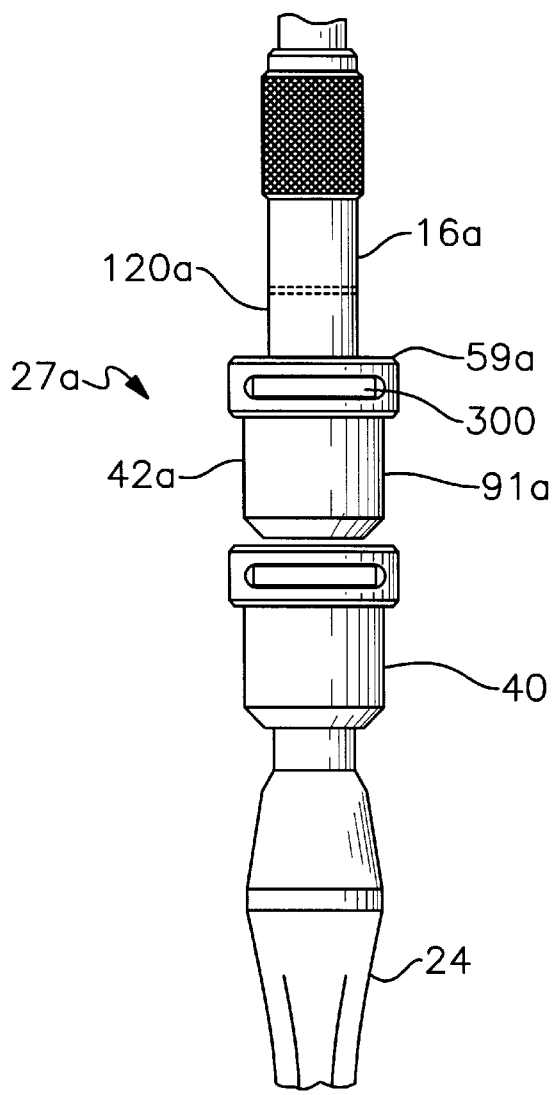
FIG. 13 is a side elevational view of an alternative embodiment of this invention, which employs a rotatable wheel type of intensity adjuster.
Figure 14:
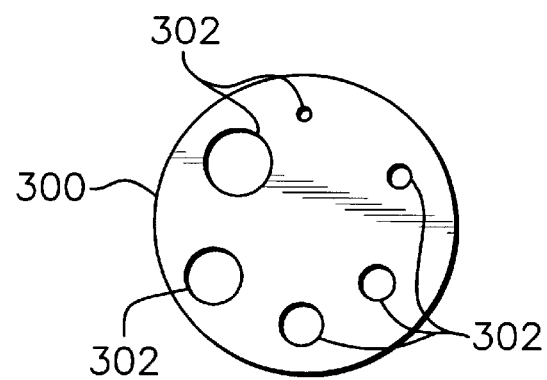
FIG. 14 is a front elevational view of an intensity adjustment wheel having a series of graduated openings.

An alternative, preferred light adjusting assembly 27a is illustrated in FIG. 13. Assembly 27a includes a color adjustment mechanism 40 that is constructed and attached to fiberoptic cable 24 in the manner previously described. In this version, an alternative intensity adjustment mechanism 42a is utilized. The intensity adjustment mechanism is constructed analogously to the color adjustment mechanism and is communicably engaged with the color adjustment mechanism in the manner previously shown in FIG. 7. Intensity adjustment mechanism 42a features a construction that is virtually identical to the construction for the color adjustment mechanism shown in FIGS. 4 and 5. Specifically, mechanism 42a includes a housing 91a and a flange 59a. An intensity adjustment wheel 300, shown alone in FIG. 14, is rotatably mounted within housing 91a such that the peripheral edge of wheel 300 protrudes from a slot in flange 59a. Wheel 300 includes a graduated series of holes or openings 302, which permit respective amounts of light to pass through intensity adjustment mechanism 42a. By rotating wheel 300, a selected one of the openings 302 is positioned in the passageway through mechanism 42a. See the analogous steps described for color adjustment mechanism 40 in FIGS. 4 and 5. As a result, a selected intensity of light is transmitted through mechanism 27a to inlet 16a of the endoscope, FIG. 13. It should be noted that mechanism 42a includes an extension 120a, which includes a central channel formed therethrough. Extension 120a is permanently or releasably secured to inlet 16a of the endoscope. Again, various known means of communicable attachment may be employed. In certain embodiments, the entire adjusting assembly 27a (or analogously assembly 27 in FIGS. 1–12) may be formed as a permanent part of the endoscope.

Figure 15:
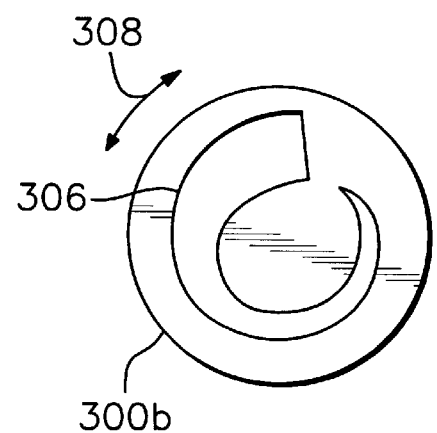
FIG. 15 is a front elevational view of an alternative intensity adjustment wheel, which employs a variable width opening.

As shown in FIG. 15, an alternative intensity adjustment wheel 300b may be substituted for wheel 300 of FIG. 14. This wheel includes a single, generally crescent or swirl-shaped opening 306, which has a continuously variable width. By rotating wheel 304 in the manner indicated by double headed arrow 308, the operator selectively positions a desired width of opening 306 across the interior passageway of mechanism 42a. This permits a selected intensity of light to be transmitted through assembly 27a and into the endoscope.

Significant advantages are achieved by locating an intensity and/or color adjustment controller at the position, shown herein. Most significantly, this mechanism permits intensity and/or color to be adjusted independently of the illuminator and proximate the endoscope by the surgeon or other person handling the endoscope. The operator can adjust the intensity and/or color virtually instantaneously, without having to divert his or her attention from the task at hand. Likewise, intensity and/or color adjustments can be made without requiring the assistance of additional personnel to control the intensity and/or color at the illuminator. Such personnel are thereby free to perform other needed tasks. The ability for the doctor or other person using the endoscope to personally perform the intensity and/or color adjustments also eliminates extraneous communications between that person and assisting personnel and eliminates the possibility of miscommunications. Intensity and/or color adjustments are accomplished far more effectively, quickly and efficiently than has been possible using conventional endoscopes and illuminators.

The components of this invention may be constructed of various types of high quality metals, metal alloys and plastics known in the medical industry. The color filters may comprise assorted known types of plastic or glass filters. Alternative, non-circular shapes may be utilized for the filters. The various materials and techniques of construction of the disclosed invention should be similar to those conventionally used for fiberoptic illuminators, cables, fittings, endoscopes and other types of medical appliances.

It should be understood that although the embodiment shown herein employs an intensity adjustment mechanism proximate each end of apparatus 20, in alternative embodiments, the intensity controller located proximate the illuminator may be eliminated and intensity adjustment capability may be provided only proximate the distal end of apparatus 20. This is the end being handled by the surgeon or other personnel using the endoscope; it is most important that independent intensity adjustment be provided proximate that end. Likewise, an optional color or filter wheel may be employed proximate end fitting 33 of apparatus 20.

It will thus be seen that the objects made apparent from the preceding description are sufficiently obtained and certain changes may be made in the above construction without departing from the scope of the invention. It is intended that all matter contained in the above description and shown in the accompanying drawings be interpreted as illustrative and not in an imitative sense. Although specific features of the invention are shown in some drawings and not others, this is for convenience only as each feature may be combined with any or all of the features in accordance with the invention. Other embodiments, within the scope of this invention, will occur to those skilled in the art.

What is claimed is:

1. A light adjustable endoscope apparatus adapted for use in combination with a video camera, said endoscope apparatus comprising:
   a scope that is operably interconnected to the video camera, said scope having an inlet for introducing light into said scope; and
   means interconnected between a light source and said inlet for transmitting light from said light source to said inlet, said means for transmitting including an elongate, light transmitting light conductor and light adjusting means attached to said conductor between the light source and said inlet for selectively adjusting at least one of the intensity and color of light transmitted through said conductor from the light source to said scope, said light adjusting means including intensity control means for controlling the intensity of the light transmitted to said scope, said intensity control means including an intensity control housing communicably connected to said light conductor and having an interior passageway through which light from the light source in transmitted to said scope, said intensity control means further including a wheel rotatably mounted in said intensity control housing, said wheel having a plurality of differently sized light openings formed therein, said wheel being rotated to position a selected one of said openings across said passageway to permit a predetermined corresponding intensity of light to be transmitted to said scope.

2. The apparatus of claim 1 in which said light conductor includes a first end portion that is communicably connected to said light source and a second end portion that is communicably connected to said inlet of said scope, said light adjusting means being disposed between at least one of said first and second ends and said light source and said inlet, respectively.

3. The apparatus of claim 1 in which said intensity control means include means communicably interconnecting said light conductor and said inlet for controlling the intensity of light delivered from said light conductor to said scope.

4. The apparatus of claim 1 in which said light conductor includes a fiberoptic cable.

5. A light adjustable endoscope apparatus adapted for use in combination with a video camera, said endoscope apparatus comprising:
   a scope that is operably interconnected to the video camera, said scope having an inlet for introducing light into said scope; and
   means interconnected between a light source and said inlet for transmitting light from said light source to said inlet, said means for transmitting including an elongate, light transmitting light conductor and light adjusting means attached to said conductor between the light source and said inlet for selectively adjusting at least one of the intensity and color of light transmitted through said conductor from the light source to said scope, said light adjusting means including intensity control means for controlling the intensity of the light transmitted to said scope, said intensity control means including an intensity control housing communicably connected to said light conductor and having an interior passageway through which light from the light source in transmitted to said scope, said intensity control means further including a wheel rotatably mounted in said intensity control housing, said wheel having a single, varable width light openings formed therein, said wheel being rotated to selectively position said opening across said passageway to permit a predetermined corresponding intensity of light to be delivered to said scope.

6. The apparatus of claim 5 in which said light conductor includes a first end portion that is communicably connected to said light source and a second end portion that is communicably connected to said inlet of said scope, said light adjusting means being disposed between at least one of said first and second ends and said light source and said inlet, respectively.

7. The apparatus of claim 5 in which said intensity control means include means communicably interconnecting said light conductor and said inlet for controlling the intensity of light delivered from light conductor to said scope.

8. The apparatus of claim 5 in which said light conductor includes a fiberoptic cable.

9. A light adjustable endoscope apparatus adapted for use in combination with a video camera, said endoscope apparatus comprising:

a scope that is operably interconnected to the video camera, said scope having an inlet for introducing light into said scope; and means interconnected between a light source and said inlet for transmitting light from said light source to said inlet, said means for transmitting including an elongate, light transmitting light conductor and light adjusting means attached to said conductor between the light source and said inlet for selectively adjusting at least one of the intensity and color of light transmitted through said conductor from the light source to said scope, said light adjusting means including color control means for controlling the color of light transmitted to said scope, said color control means including a color control housing that is communicably connected to said light conductor, said color control housing having means defining an interior passageway through which light is transmitted, said color control means further including a filter wheel mounted rotatably within said color control housing and carrying a plurality light filters, each said light filter defining a selected wavelength band, said filter wheel being rotated to position a selected filter across said passageway of said color control housing such that a corresponding wavelength band of light is transmitted through said passageway.

10. The apparatus of claim 9 in which said light conductor includes a first end portion that is communicably connected to said light source and a second end portion that is communicably connected to said inlet of said scope, said light adjusting means being disposed between at least one of said first and second ends and said light source and said inlet, respectively.

11. The apparatus of claim 9 in which said light conductor includes a fiberoptic cable.

12. A light adjustable endoscope apparatus adapted for use in combination with a video camera, said endoscope apparatus comprising:

a scope that is operably interconnected to the video camera, said scope having an inlet for introducing light into said scope; and means interconnected between a light source and said inlet for transmitting light from said light source to said inlet, said means for transmitting including an elongate, light transmitting light conductor and light adjusting means attached to said conductor between the light source and said inlet for selectively adjusting at least one of the intensity and color of light transmitted through the conductor from said light source to said scope, said light adjusting means including color control means for controlling the color of light transmitted to said scope, said color control means including means interconnected between said light conductor and said inlet for controlling the color of light delivered from said light conductor to said inlet.

13. The apparatus of claim 12 in which said light conductor includes a first end portion that is communicably connected to said light source and a second end portion that is communicably connected to said inlet of said scope, said light adjusting means being disposed between at least one of said first and second ends and said light source and said inlet, respectively.

14. The apparatus of claim 12 in which said light conductor includes a fiberoptic cable.

* * * * *